(12) United States Patent
Hübner

(10) Patent No.: US 9,991,823 B2
(45) Date of Patent: Jun. 5, 2018

(54) ASSEMBLY FOR AN ULTRASONIC MOTOR

(71) Applicant: PHYSIK INSTRUMENTE (PI) GMBH & CO. KG, Karlsruhe (DE)

(72) Inventor: Reinhard Hübner, Waldbronn (DE)

(73) Assignee: PHYSIK INSTRUMENTE (PI) GmbH & Co. KG, Karlsruhe (DE)

( * ) Notice: Subject to any disclaimer, the term of this patent is extended or adjusted under 35 U.S.C. 154(b) by 316 days.

(21) Appl. No.: 14/772,278

(22) PCT Filed: Mar. 7, 2014

(86) PCT No.: PCT/EP2014/054429
§ 371 (c)(1),
(2) Date: Sep. 2, 2015

(87) PCT Pub. No.: WO2014/135675
PCT Pub. Date: Sep. 12, 2014

(65) Prior Publication Data
US 2016/0036352 A1 Feb. 4, 2016

(30) Foreign Application Priority Data

Mar. 8, 2013 (DE) .................. 10 2013 204 026

(51) Int. Cl.
*H02N 2/00* (2006.01)
*H02N 2/10* (2006.01)

(52) U.S. Cl.
CPC ........... *H02N 2/0065* (2013.01); *H02N 2/001* (2013.01); *H02N 2/006* (2013.01); *H02N 2/0055* (2013.01); *H02N 2/103* (2013.01)

(58) Field of Classification Search
CPC ...... H02N 2/001; H02N 2/0055; H02N 2/006; H02N 2/0065; H02N 2/103
USPC .................................. 310/323.01–323.21
See application file for complete search history.

(56) References Cited

U.S. PATENT DOCUMENTS

2006/0113867 A1* 6/2006 Sakatani ............... G02B 7/023
310/323.17

OTHER PUBLICATIONS

International Search Report and Written Opinion for International Application No. PCT/EP2014/054429, dated May 26, 2014, date of filing: Mar. 7, 2014, no English Translation, 9 pages.

* cited by examiner

*Primary Examiner* — Derek Rosenau
(74) *Attorney, Agent, or Firm* — Christopher R. Christenson; Kelly, Holt & Christenson, PLLC

(57) ABSTRACT

The invention relates to an assembly for an ultrasonic motor, comprising an actuator body, an actuator retainer that accommodates the actuator body, an actuator bearing, and a friction element driven by the actuator body, wherein there is planar frictional contact between the actuator body and the friction element and the assembly has an optimized tilt axis, about which the actuator retainer and/or the friction element can be pivoted and which is arranged at a distance from the center of gravity of the actuator body and is shifted in the direction of the section of the friction element touched by the actuator body.

10 Claims, 13 Drawing Sheets

ASSEMBLY FOR AN ULTRASONIC MOTOR

CROSS-REFERENCE TO RELATED APPLICATION

Figure 1:
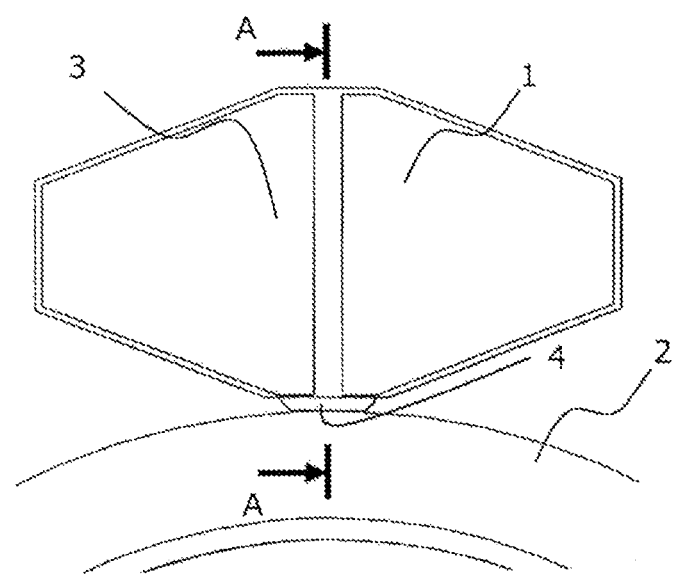

This Application is a Section 371 National Stage Application of International Application No. PCT/EP2014/054429, filed Mar. 7, 2014 and published as WO 2014/135675 A1 on. Sep. 12, 2014, the contents of which are hereby incorporated by reference in their entirety.

The invention relates to an assembly for an ultrasonic motor in accordance with claim 1.

The basic components of ultrasonic motors are an actuator body, which an electrode arrangement induces to vibrate in the ultrasonic frequency range by means of piezoelectric effect, and a friction element in frictional connection with the actuator body and which moves from same upon the ultrasonic vibrations. The actuator body hereby forms the stator of the ultrasonic motor and the friction element the rotor in the case of a rotation motor or the linearly moved element in the case of a linear motor.

The actuator body is supported by an actuator retainer and positioned in relation to the friction element by further elements while the friction element is supported or positioned respectively by a corresponding friction element retainer. Together with the actuator retainer and an actuator bearing, the above-cited components make up an assembly for the ultrasonic motor. In a realistic configuration of the ultrasonic motor, these components of the assembly, particularly those involved in the positioning of the actuator body, are only of limited rigidity. As its position varies during the operation of the ultrasonic motor, the alignment between the actuator body and the friction element also varies and/or fluctuates and is not optimal in every case. Among other things, these fluctuations result in strong forces transverse to the drive direction. These in turn cause additional displacing of the actuator body and thus to some extent aggravate the disadvantageous positioning of the actuator body relative to the friction element. This produces a series of further undesirable phenomena in the ultrasonic motor such as, for example, irregular operation.

These detrimental effects can be counteracted to a certain extent by configuring the smallest possible contact between the actuator body and the friction element, in effect reducing it to one point. However, such a point contact produces high contact pressure between the actuator body and the friction element and limits frictional connection efficacy over time and above all the service life of the actuator body and/or friction element.

It is thus the task to create an assembly for an ultrasonic motor in which the inevitable configuration of only limited rigidity has only minimized adverse reciprocal effects as described above or is even structured as a whole such that the negative properties of the actual configuration offset or even advantageously augment each other to the greatest possible extent. The objective also consists of being able to enlarge the contact area between the actuator body and friction element to such an extent as to increase the service life of the actuator body and the friction element, although while minimizing or at least not adversely affecting the inevitable actuator displacement and associated effects.

This task is solved by an assembly for an ultrasonic motor having the features of claim 1. The subclaims set forth expedient and/or advantageous embodiments of the assembly.

The ultrasonic motor assembly comprises an actuator body, an actuator retainer accommodating the actuator body, an actuator bearing and a friction element driven by said actuator body, wherein there is planar frictional contact between the actuator body and the friction element. The assembly thereby has an optimized tilt axis about which the actuator retainer, and with it the actuator body or the friction element, respectively the corresponding friction element retainer, can be pivoted. The optimized tilt axis hereby does not run through the center of gravity of the actuator body but is rather spaced at a distance from the actuator body's center of gravity and displaced outward from same toward the section of the driven friction element which the actuator body contacts.

In one advantageous embodiment of the inventive assembly, the optimized tilt axis runs through the cross-sectional area of the driven friction element section which the actuator body contacts, whereby in particular a stabilization and/or a self-alignment with respect to the frictional pairing of actuator body/driven friction element results. The basic concept behind the inventive assembly is that of taking advantage of the inevitable tilting of the actuator retainer and thus the actuator body relative to the driven friction element to optimally align the frictional pairing of actuator body/friction element. This basic concept is thereby realized by designing the actuator bearing of the assembly so as to enable the actuator body to tilt about an optimized tilt axis which does not run through the center of gravity of the actuator body but is rather displaced toward the friction surface so as to result in an altered and as a rule shorter leveraging of the transverse force about the optimized tilt axis, increasing the actuator body's moment of inertia. In a particularly advantageous further development, the optimized tilt axis runs through the cross-sectional area of that section of the friction element which at that moment is in contact with the actuator body and in frictional connection with same. In such a configuration, the occurrent transverse forces stabilize the position of the friction element, as will be described in greater detail below. Thus, in effect, an inevitable negative effect is used to self-stabilize and self-align the inventive assembly.

Inventively displacing the actuator's rotational degree of freedom from the actuator body's center of gravity into the direction of thrust; i.e. toward the friction element, considerably reduces the amplitude as well as also the speed and the frequency, and thus the energy content, of unwanted transverse actuator motion. In the prior art, a conventionally positioned tilt axis at the actuator center of gravity results in the disadvantage of irregular contact pressure with strong transverse force on the friction element. Particularly by having the optimized tilt axis run through the cross-sectional area of that section of the friction element momentarily in contact with the actuator body reduces the irregular contact pressure relative the optimized tilt axis displaced toward the friction surface with the consequence of the resulting transverse force all but disappearing. The result of the inventive assembly is a commensurate ultrasonic motor having smooth and even operation and an associated longer service life for the actuator body or the friction element respectively. A substantially better control of the ultrasonic motor's control characteristics moreover results.

An assembly according to the invention enables the possibility of turning the rotational degree of freedom of the actuator, or the optimized tilt axis respectively, by a few degrees about the vertical or normal of the friction surface relative to the friction element, whereby the overall drive then runs even more harmonically; i.e. more vibration-free.

The above implementations relate exclusively to the tilting of the actuator body, or the actuator retainer respectively, relative to the friction element. However, the inventive concept also encompasses the possibility of the friction element, a corresponding friction element retainer respectively, being accordingly tilted relative to the actuator body. What is essential is thus the corresponding relative motion between the actuator body/actuator retainer and the friction element/friction element retainer.

In one embodiment, the actuator bearing is formed by a plain bearing, its slide surfaces having a tilt variance. The axis of the tilt variance is identical to optimized tilt axis C/C'. The tilt variance is thereby the plain bearing's only degree of freedom. The plain bearing converts other movements into the tilt variance.

Advantageously, the slide surfaces of the plain bearing are thereby pressed against each other by means of a pressure spring. This gives the plain bearing a certain basic rigidity, however with a sufficiently good tilt variance still being maintained. It is likewise conceivable for the slide surfaces of the plain bearing to be pressed against each other by means of at least one tension spring.

In one advantageous embodiment, the pressure spring is counter-supported on a spatially fixed actuator frame. The actuator retainer thereby divides the pressure spring force into a normal and a tangential component. The normal component presses the actuator body onto the friction element and the tangential component presses the slide surfaces of the actuator bearing together. A certain force ratio is thus set between the force ensuring the frictional connection between the actuator body and the friction element and the force dictating the degree of actuator element tilt about the optimized tilt axis. The tilt, plain bearing and frictional connection thus act together in complementary and reciprocal operation.

In conjunction with the above, the friction element driven by the assembly is a rotationally driven element having an annular outer contour.

In a further embodiment, the actuator bearing is designed as a so-called goniometer bearing.

In an advantageous further development, the goniometer bearing comprises a goniometer plate mounted on a spatially fixed actuator frame and incorporating the actuator retainer by means of an opening, wherein the goniometer plate has a form which enables a tilting of the actuator bearing about an axis identical to the path of the optimized tilt axis.

In this embodiment, the rigidity to the actuator retainer bearing is thus achieved by the flexural rigidity of the goniometer plate. The reduction in the possible degrees of freedom to the tilt variance and the alignment of the tilt axis to the optimized tilt axis is achieved by the design of the goniometer plate.

In one advantageous embodiment, the actuator retainer is held in the opening of the goniometer plate by means of a rear-bearing spring arrangement on the spatially fixed actuator frame. No rigid fastening mechanism is thus used in supporting the actuator retainer in the goniometer plate but rather only tensioning means. This prevents any tension from being introduced via localized point screw connections and simplifies the structure of the assembly.

In one expedient embodiment, the spring arrangement is formed by at least two pressure springs, whereby the paths of the compressive forces exerted by the pressure springs intersect in the region of a frictional element disposed on the actuator body. This thereby gives the spring arrangement a centering and stabilizing effect on the assembly of actuator retainer and goniometer plate as well as on the contact of actuator body, frictional element and friction element.

It can be advantageous for the driven friction element to be a linearly driven friction element, preferably having a planar contour.

In one advantageous embodiment of the assembly, at least a part of the slide surfaces is configured as a flexure bearing or flexure bearings.

The following will reference embodiments in describing the assembly in greater detail. Accompanying FIGS. 1 to 9 serve for illustrative purposes. The same reference numerals are used for identical and identically functioning components.

Figure 2:
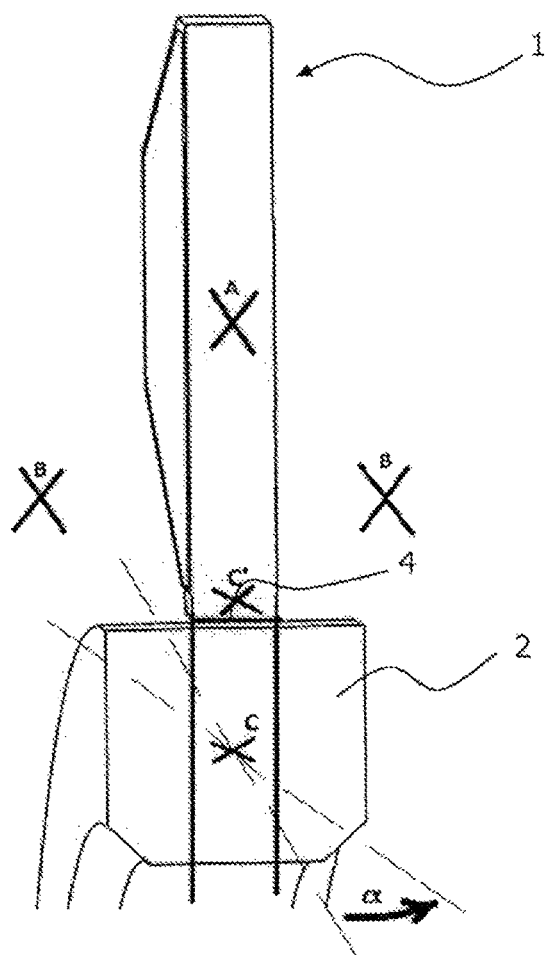
Figure 3:
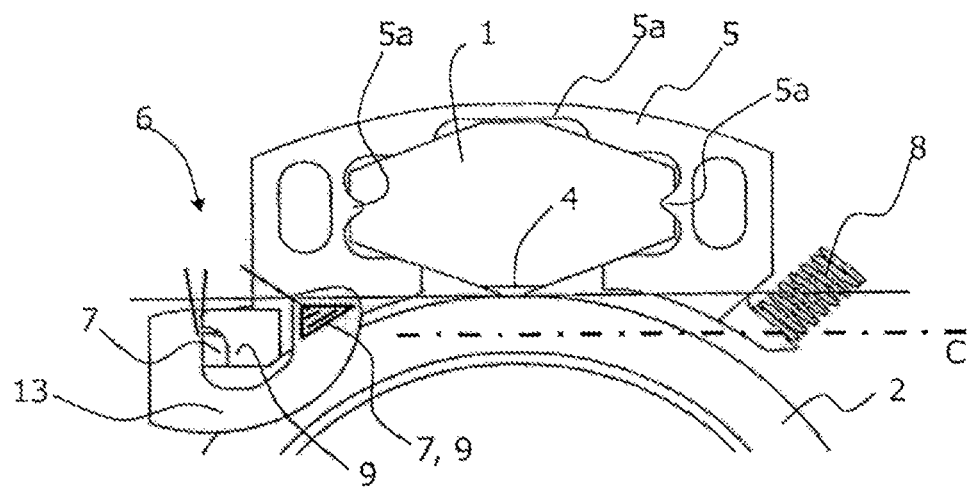
Figure 4:
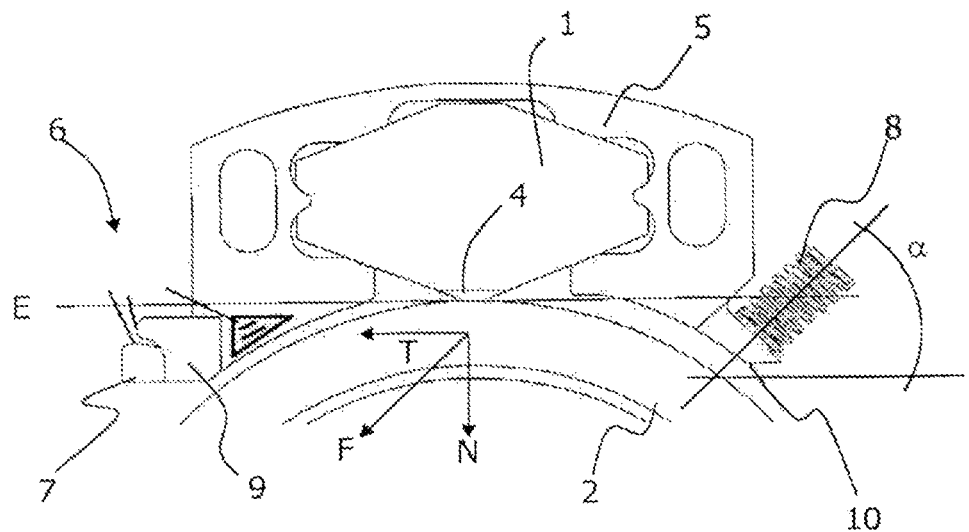
Figure 5:
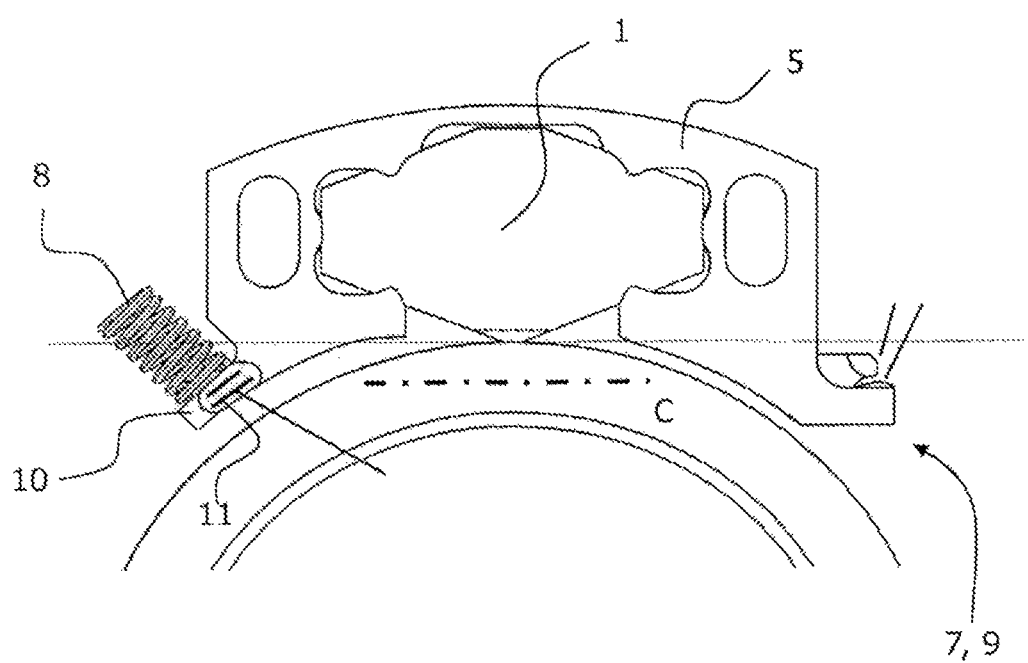
Figure 6:
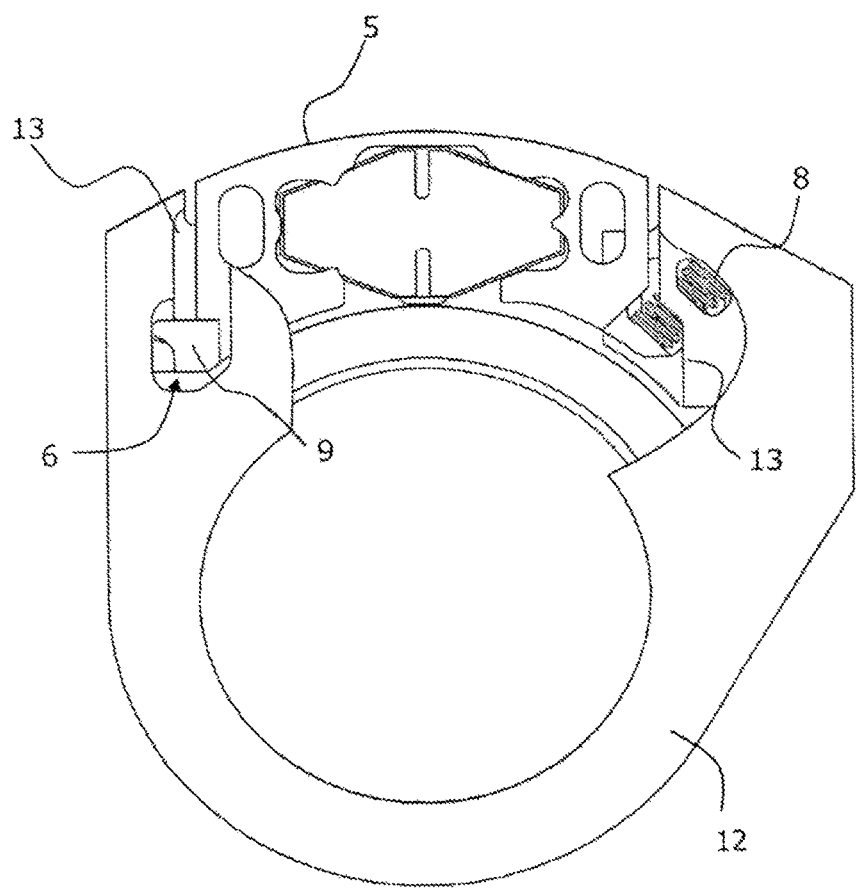
Figure 7:
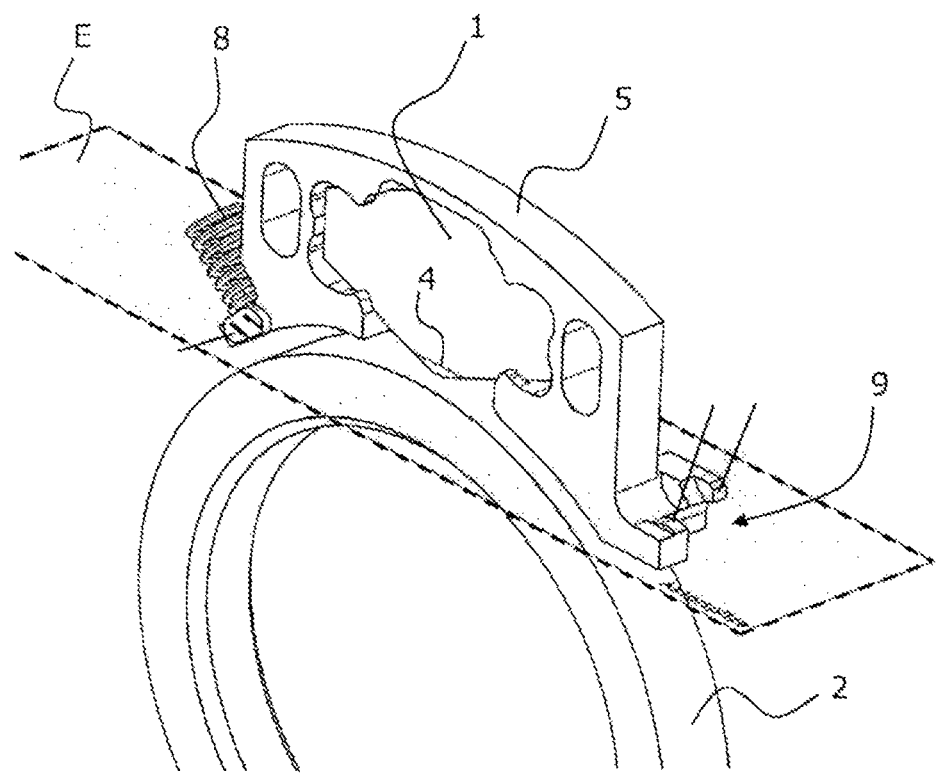
Figure 8:
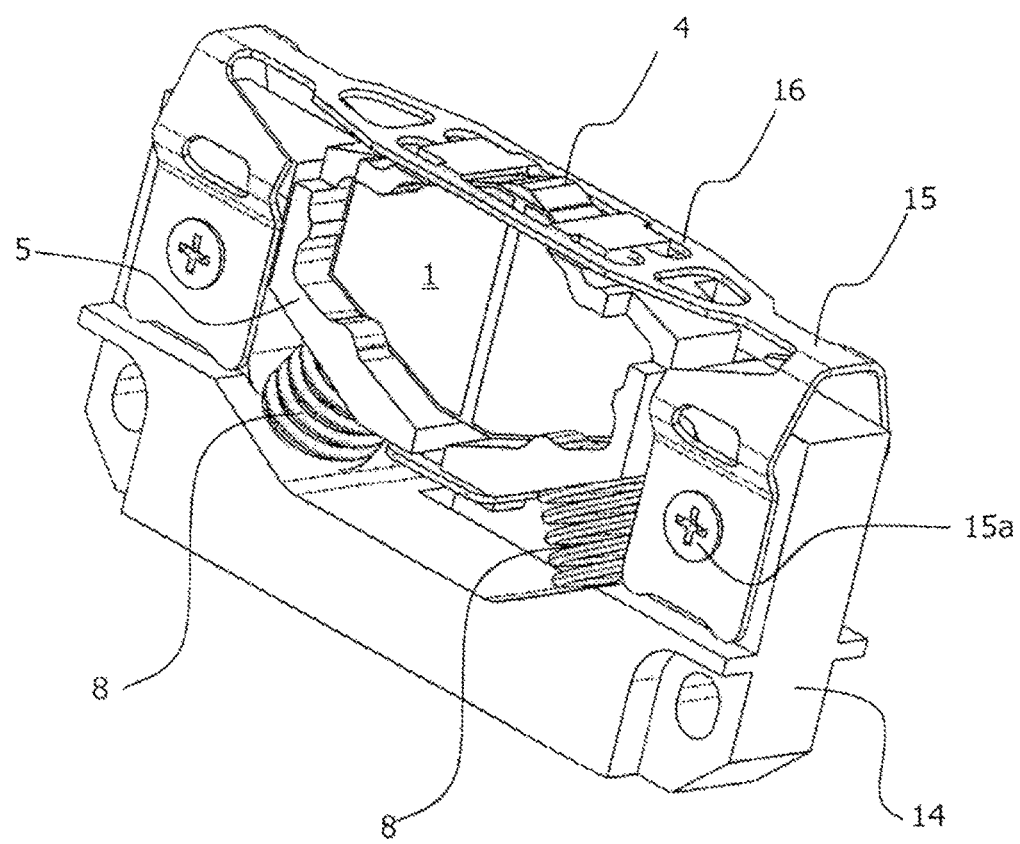
Figure 9:
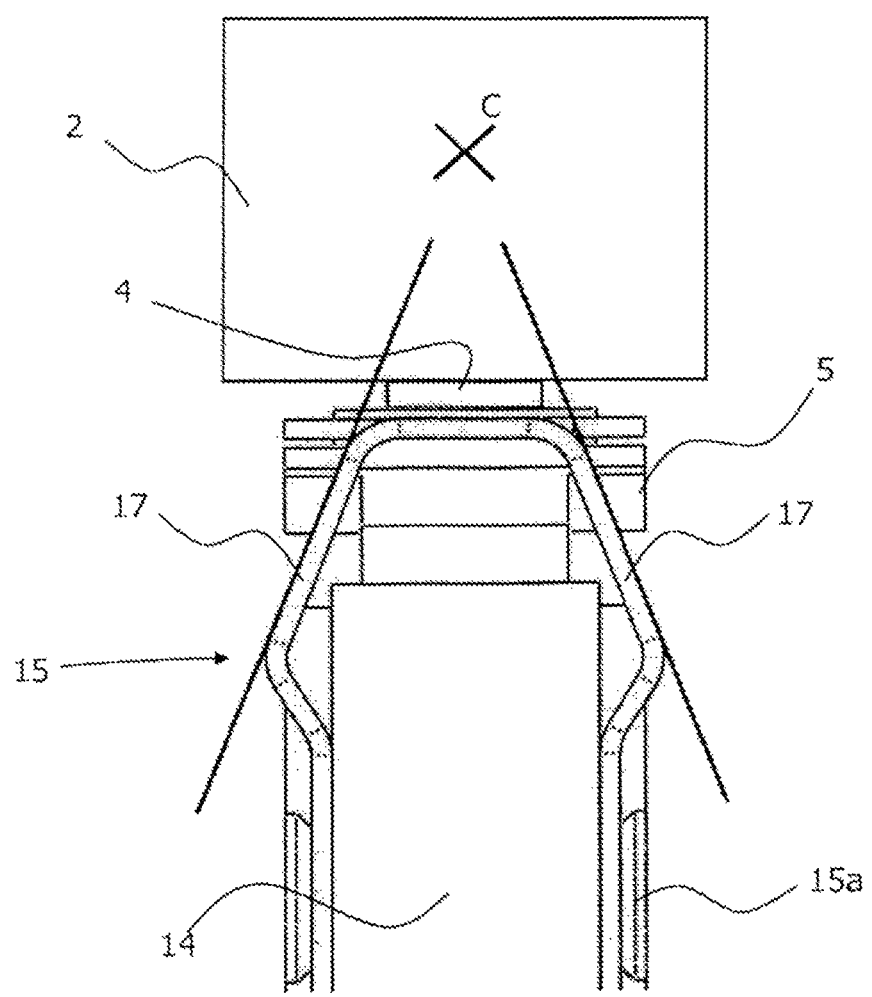
Figure 10:
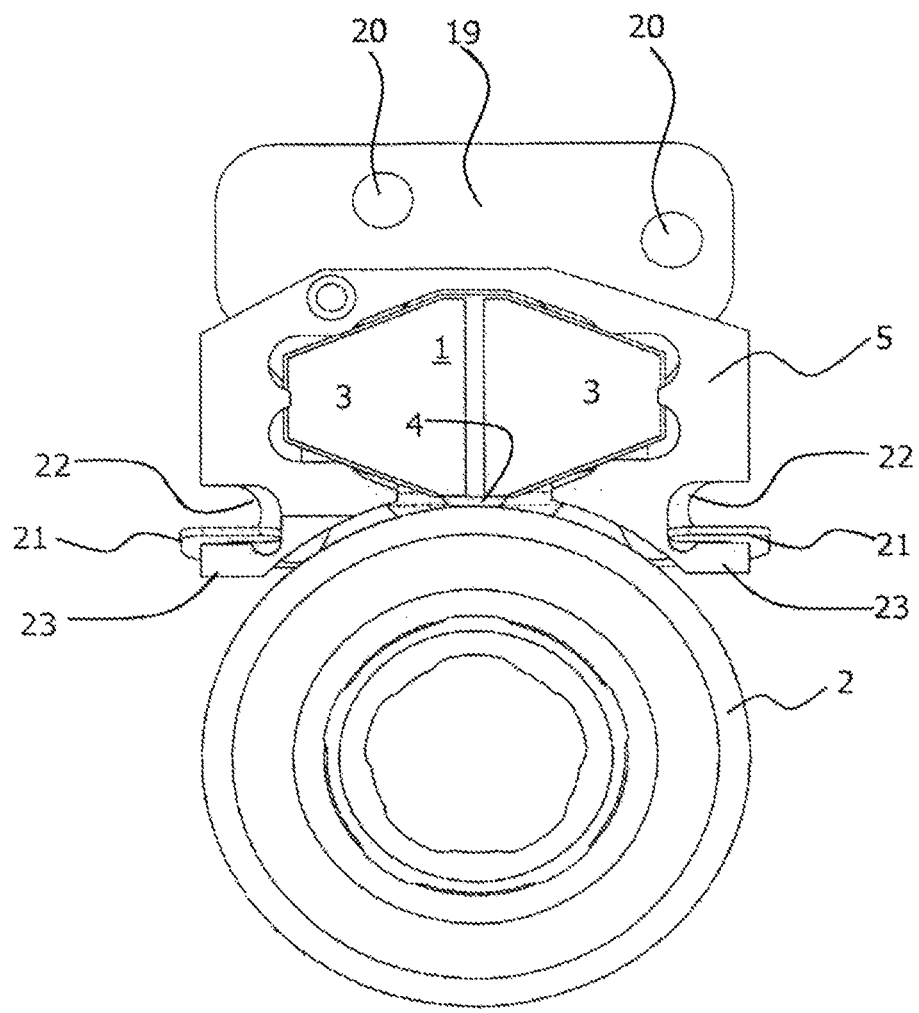
Figure 11:
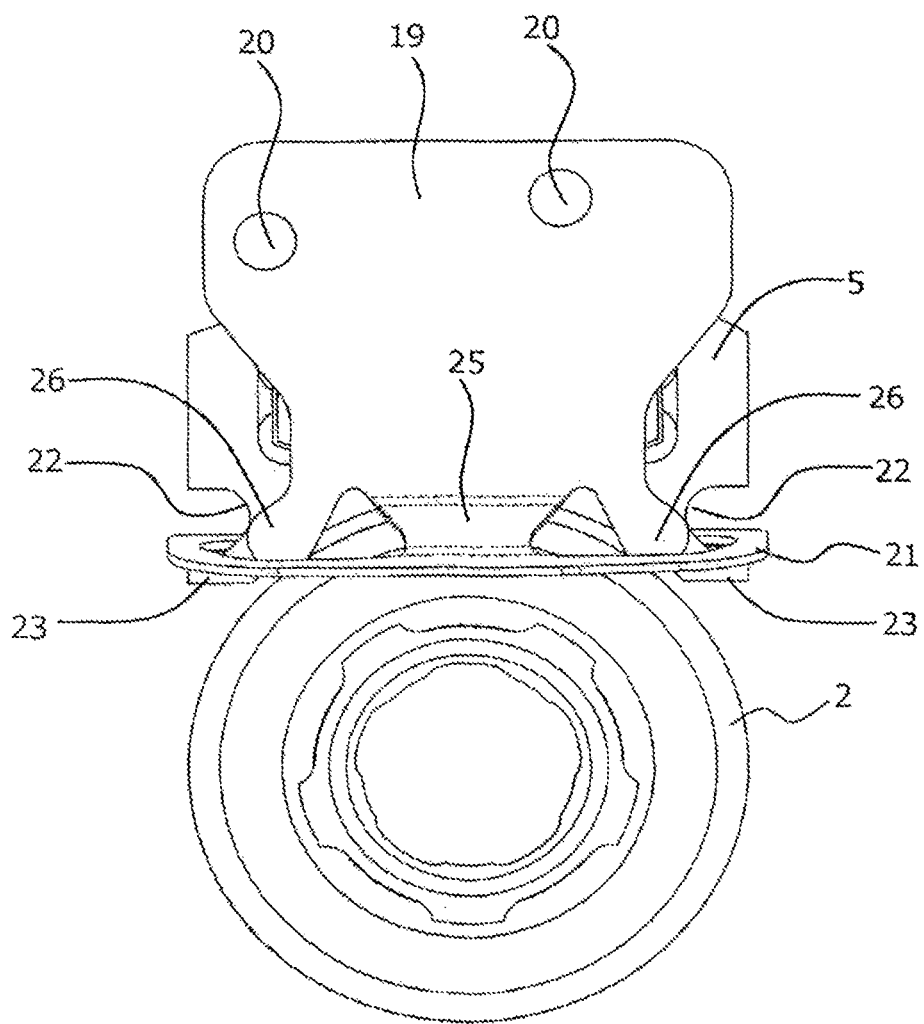
Figure 12:
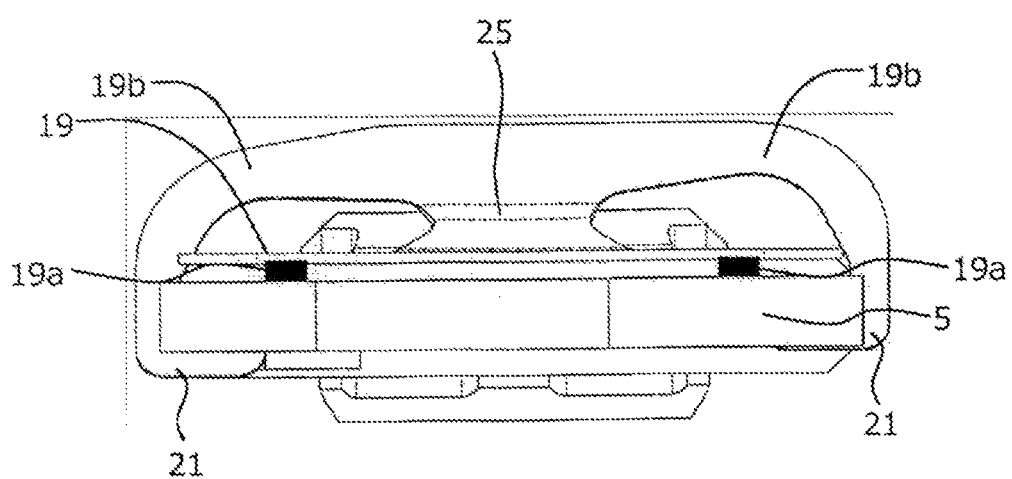
Figure 13:
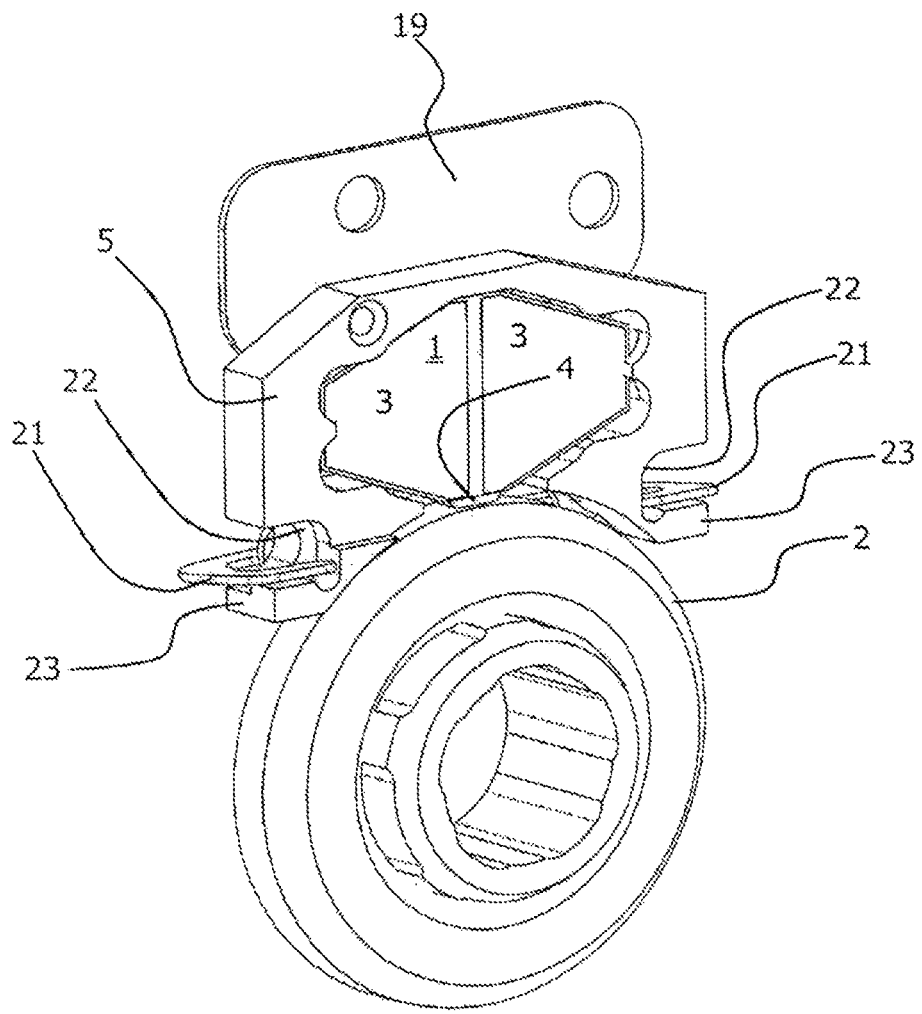
Figure 14:
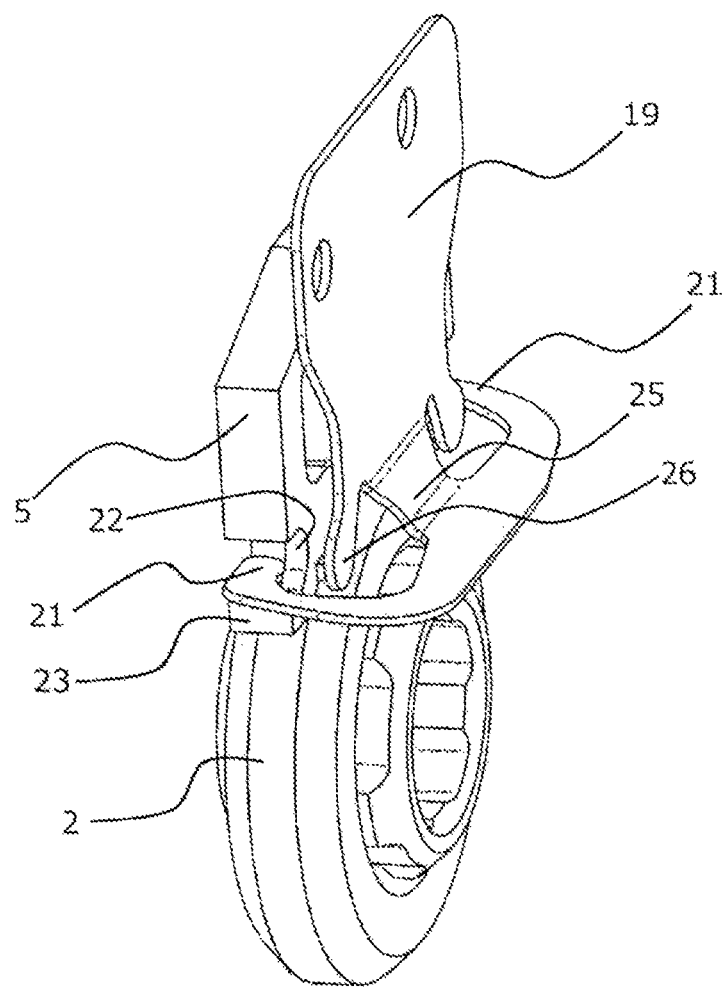

Shown are:

FIG. 1 a schematic diagram of an actuator body having an annular friction element, FIG. 2 a sectional view of the FIG. 1 assembly showing a plurality of possible tilt axes and an optimized tilt axis as well as suggested rotation a of the optimized tilt axis C/C' about the normal of the friction surface, FIG. 3 a first representation of a first embodiment of the assembly, FIG. 4 a second representation of the first embodiment of the assembly, FIG. 5 a rear view of the FIGS. 3 and 4 assembly, FIG. 6 a rear view of the FIGS. 3 to 5 assembly comprising a mount, FIG. 7 a perspective representation of the assembly shown in the previous figures, FIG. 8 a perspective representation of an assembly having a goniometer plate, FIG. 9 a side view of the assembly shown in FIG. 7, FIG. 10 a frontal view of a further embodiment of an assembly of actuator body and friction element, FIG. 11 a rear view of the assembly shown in FIG. 10, FIG. 12 a top plan view of the assembly shown in FIG. 10, FIG. 13 a frontal perspective view of the assembly shown in FIG. 10, FIG. 14 a side perspective view of the assembly shown in FIG. 10.

FIG. 1 is a schematic diagram of an actuator body 1 and a friction element 2, annular in this figure, associated with said actuator body. The actuator body is composed of a single-layer or multi-layer piezoelectric material, particularly a piezoelectric ceramic or a piezoelectric crystal. The actuator body, which is rhombic in this figure, comprises electrode surfaces 3 by means of which the actuator body is supplied with electrical alternating voltage. The actuator body vibrates in the ultrasonic frequency range and is in contact with the friction element 2 via a frictional element 4. The friction element is thereby set into a rotational motion.

FIG. 2 shows a sectional view of the FIG. 1 assembly along intersecting line A-A. The assembly of actuator body 1 and friction element 2 is ideally situated in one plane. The support of the actuator body 1 can, however, be configured as shown with only a limited rigidity. For this reason, the actuator body 1 tilts from the common shared plane of actuator body 1 and friction element 2. This tilting motion can ensue about different tilt axes. Some of said tilt axes are marked in FIG. 2. In the case of tilt axis A, which substantially corresponds to the actuator's center of gravity, the actuator body 1 tilts about its own longitudinal axis. Such a tilting is extremely disadvantageous because a force then acts on friction element 2 to drive it out of the common plane of actuator body 1 and friction element 2, additionally amplifying the tilting motion of the actuator body 1. This thereby intensifies the disrupting of the path of the friction element induced by the tilting motion about axis A and the assembly of actuator body 1 and friction element 2 ultimately becomes unstable.

A tilting motion about one of the B axes or about both of these axes corresponds to a tilting motion in which the actuator body 1 either swings out to one side from the common plane of actuator body 1 and friction element 2, and thereby at least partially raises from the friction element 2, or in which the actuator body 1 oscillatingly swings out to both sides in turn from the common plane of actuator body 1 and friction element 2. In the first case, a stable equilibrium with constant transverse force can ensue, whereas no stable equilibrium can ensue in the second case, resulting in uncontrollable vibration of the actuator body 1 which leads to a considerable decrease in driving force and to a high-pitched, squeaking noise during operation.

When the tilt axis is shifted from the position of tilt axis A toward C'; i.e. toward frictional element 4, the result is an accordingly shortened leveraging of the unwanted transverse forces about the tilt axis as well as an increased actuator moment of inertia. In consequence, the amplitude, but also the speed and/or frequency of unwanted transverse actuator motion are considerably reduced, which leads to an associated engine running more smoothly and harmonically.

A tilting about tilt axis C is particularly advantageous since doing so results in a self-stabilizing alignment of the inventive assembly. In accordance with FIG. 2, the tilt axis C runs perpendicular to the cross section of that section of the friction element 2 which is at that moment in mechanical or frictional contact with the actuator body. When the actuator body 1 tilts about axis C, the position of the friction element is extremely stable. In each respective tilt position, the actuator body 1 thereby always acts in the direction of positionally stable tilt axis C and is moreover also in consistently uniform contact with friction element 2.

The optimized position of tilt axis C/C' results in an altered and as a rule shorter leveraging of the transverse force about the selected tilt axis. The remaining forces toward the surface of the frictional element 4 result in a stabilizing of the assembly, with an ultrasonic motor realized as such having lower-wear operation and considerably improved control characteristics.

A further improvement to the inventive assembly and thus a respective actuation is achieved by the optimized tilt axis C/C' being turned a few degrees about the normal of the friction surface; i.e. the contact area between the actuator body and friction element, as is basically shown by the arrow and angle α in FIG. 2.

FIG. 3 shows a first embodiment of an assembly having optimized and self-stabilizing tilt axis C. The assembly shown in this figure realizes the basic principle of rhombic actuator body and annular friction element shown in FIG. 1. The actuator body 1 here is surrounded by an actuator retainer 5 which encloses the actuator body and positively fixes it in its position within the actuator retainer at a number of locking points 5a. The actuator retainer forms a mechanical mechanism for holding the actuator body and fixing and aligning it within the assembly.

The fixing and alignment of the actuator retainer, and thus the actuator body, ensues in the present case by means of a plain bearing 6 having a plurality of slide surfaces 7 on one side and a pressure spring 8 on the other. The slide surfaces of the plain bearing are configured so as to allow the actuator retainer passing through them to tilt about optimized tilt axis C, likewise marked here. The plain bearing as such is designed without additional fastening mechanisms. The actuator retainer 5 is positively mounted on the slide surfaces of the plain bearing by means of corresponding counterfaces 9. This positive seating is stabilized by the contact pressure produced by the pressure spring 8. The pressure spring 8 is hereto rear-mounted on an initially not shown actuator frame.

FIG. 4 shows the distribution of the compressive force exerted by pressure spring 8. The compressive force F produced by the spring acts on force transducer 10 on the actuator retainer 5. The force transducer exhibits a ratio angle α relative to the frictional plane E defined by the bearing surface of the frictional element 4 on friction element 2. As a result of this ratio angle, the compressive force F exerted by the pressure spring 8 is divided into a tangential component T and a normal component N. The tangential component T presses the actuator retainer 5 against the slide surfaces 7 of the plain bearing 6 and induces at that point the form-fitting of the actuator retainer counterfaces 9 and the slide surfaces 7 of the plain bearing 6. The normal component N presses the actuator retainer 5 and thus the frictional element 4 of the actuator body 1 toward the friction element 2 so that the required frictional connection will be produced between the frictional element and the friction element. The position of the plain bearing in the extension of the optimized tilt axis C ensures the optimal position of the tilt axis for the assembly as shown here. This is in each case below the frictional plane E and thus in the optimal range according to the invention.

FIG. 5 depicts the assembly shown in FIGS. 3 and 4 from the rear. The force transducer 10 on the actuator retainer 5 comprises a contact surface 11 for a rear plain bearing on a (not shown in the figure here) rear wall. This gives the force transducer stable guidance, whereby the direction of the force produced by the pressure spring 8 acts on the force transducer in a clearly defined manner and is converted from that point by the actuator retainer as described.

FIG. 6 shows the assembly's previously described components together with a mount 12. The mount is hereby depicted transparently. In an actual realization of the inventive assembly, same is a sufficiently stable plate made of plastic, metal or another material of comparable rigidity which is provided with recesses 13 at the appropriate locations. One of the recesses serves as a counter bearing for the pressure spring 8, sections of a second recess serve as additional guide means for the counterface 9 arranged on the actuator retainer 5 and thus cooperates with the plain bearing 6. The mount 12 is fixed in position in a manner not shown and thus connects the assembly to not shown external mechanisms.

FIG. 7 shows a perspective overall view of the previously described assembly. The plain bearing 6 with the slide surfaces 7 has been omitted in this figure. The counterface 9 on the actuator retainer 5 as well as the actuator body 1 can be noted here. Frictional plane E is likewise depicted. It is the tangential plane of the friction element running through the contact point of the frictional element 4 and the friction element 2. The optimal tilt axis C is not marked in this figure. It runs below frictional plane E.

FIG. 8 shows a further inventive assembly suited for linear drives, wherein the respective actuator bearing constitutes a goniometer bearing. The assembly encompasses a likewise rhombic-shaped actuator body 1 with friction element 4. The actuator body is likewise enclosed by an actuator retainer 5. Said actuator retainer rests within an actuator frame 14. Said actuator frame is advantageously a solid metal or plastic component. The actuator frame 14 serves on one side as a counter bearing for two pressure springs 8 which brace the actuator retainer 5 against the actuator frame. On the other side, a so-called goniometer plate 15 is affixed to the actuator frame 14 by means of a screw connection 15a. The goniometer plate comprises at least one opening 16 which accommodates and thereby encloses a section of the actuator retainer 5 provided for the purpose. The actuator retainer is thus pressed into the opening 16 of the goniometer plate 15 by the pressure springs 8, with the actuator frame 14 as a counter bearing, and is thereby supported between the actuator frame and the goniometer plate.

In the example shown in FIG. 8, the axes of the pressure springs 8 slant toward one another. Together with the opening 16 in the goniometer plate 15, the actuator retainer is thus supported so as to be secured against displacement. The longitudinal axes of the pressure springs 8 thereby intersect in the region of frictional element 4. The compressive force produced by the pressure springs is thus concentrated on the frictional element, particularly its contact surface with the friction element, and thereby produces an optimal frictional connection with the friction element.

FIG. 9 is an enlarged side view of the FIG. 8 apparatus showing the structure of the goniometer plate 15. The goniometer plate exhibits tapering sides 17, their paths intersecting at notional point C. This point is located within the cross section of the driven friction element 2. The axis running through this point perpendicular to the plane of the sheet is identical to the optimized tilt axis C of the assembly. The goniometer plate thus defines the degree of lateral tilt freedom such that its tilt axis corresponds to the optimized tilt axis C.

FIG. 10 shows a frontal view of a further embodiment of an actuator body and friction element assembly. This embodiment draws on an actuator body 1 as per the previous embodiments. It comprises the previously described electrode surfaces 3 and is set into the actuator retainer 5. The actuator retainer 5 is connected to a suspension frame 19 which in the present embodiment provides the flexible support for the actuator retainer. The suspension frame 19 comprises a series of drill holes 20 for fixing the entire assembly within an overall encompassing apparatus.

The suspension frame 19 and the actuator retainer 5 engage with one another. To this end, tensioning sections 21 projecting forward from the suspension frame 19 are firstly provided. These engage into recesses 22 of the actuator retainer provided for the purpose and press the actuator frame toward the suspension frame. The projections 23 of the actuator retainer situated below the forward projecting tensioning sections 21 of the retaining frame moreover engage around said sections. As a whole, components 21, 22 and 23 form a locking mechanism for the actuator retainer within the suspension frame.

FIG. 11 depicts this assembly from the rear. The figure shows the suspension frame 19 as well as the (partly covered) actuator retainer 5. The tensioning sections 21 are connected to the suspension frame 19 by a curved bar 25. The suspension frame 19 additionally secures the actuator retainer 5 to the rear by means of wing-shaped retaining tongues 26.

FIG. 12 shows a view of the FIG. 10 and FIG. 11 assembly from above. The suspension frame 19 in this view is a thin sheet plate, the actuator retainer 5 arranged in front of it. A plain bearing 19a is disposed between the suspension frame 19 and the actuator retainer 5 by which the actuator retainer is supported on the suspension frame. The suspension frame 19 gives way at the curved bar 25 to the tensioning section 21 by way of a curved part 19b which extends around the actuator retainer 5 to the left and the right, engaging there into recesses 22 and pressing the actuator retainer toward the suspension frame.

FIG. 13 shows the assembly from FIG. 10 in a perspective frontal view. Depicted here is the suspension frame 19, the actuator retainer 5 with actuator body 1 situated in front of it, as well as the recesses 22 on the actuator retainer together with the projections 23 and tensioning sections 21 engaging therein.

FIG. 14 depicts the FIG. 10 assembly in a perspective view from the rear. Again shown here is the suspension frame 19 giving way to tensioning sections 21 over the curved bar 25. Easily recognized here is the engaging of the tensioning sections 21 into the recesses 22 of the actuator retainer 5.

Thus, in the embodiment shown in FIGS. 10 to 13, the suspension frame 19 performs the function of the goniometer plate 15 from FIGS. 8 and 9. In the present case, the tensioning sections 21 together with the actuator retainer recesses 22 assume the providing of support secured against displacement, whereby the tilt axes are also directed as is usual per the previous embodiments.

After having used embodiments to describe the inventive apparatus, further configurations are then set forth in the subclaims.

LIST OF REFERENCE NUMERALS

1 actuator body
2 friction element
3 electrode surface
4 frictional element
5 actuator retainer
5a locking point
6 plain bearing
7 slide surfaces
8 pressure spring
9 counterface
10 force transducer
11 contact surface
12 mount
13 recess
14 actuator frame
15 goniometer plate
15a screw connection
16 opening
17 tapered sides
19 suspension frame
19a plain bearing
19b curved part
20 drill hole
21 tensioning section
22 recess
23 projection
25 bar
26 retaining tongue
a pressure spring setting angle
A first possible tilt axis
B second possible tilt axis
C optimized tilt axis
E frictional plane
F compressive force
N normal component
T tangential component

What is claimed is:

1. An assembly for an ultrasonic motor, the assembly comprising:
    an actuator body;

an actuator retainer accommodating the actuator body;

an actuator bearing and a friction element driven by the actuator body, wherein there is planar frictional contact between the actuator body and the friction element and the assembly has an optimized tilt axis about which the actuator retainer or the friction element is pivotable and which is spaced at a distance from the actuator body's center of gravity and displaced toward the section of the friction element which the actuator body contacts; and wherein the actuator bearing is designed as a goniometer bearing which enables a tilting of the actuator bearing about an axis identical to the path of the optimized tilt axis.

2. The assembly according to claim 1, wherein the optimized tilt axis runs through the cross-sectional area of the section of the driven friction element which the actuator body contacts such that a self-stabilizing alignment of the assembly results.

3. The assembly according to claim 1, wherein the actuator bearing is formed by a plain bearing, its slide surfaces having a tilt variance, the axis of which is identical to optimized tilt axis.

4. The assembly according to claim 3, wherein the slide surfaces of the plain bearing are pressed against each other by a pressure or tension spring.

5. The assembly according to claim 4, wherein, the pressure spring is counter-supported on a spatially fixed actuator mount, wherein the actuator retainer divides the pressure spring force into a normal and a tangential component, wherein the normal component presses the actuator body onto the friction element and the tangential component presses a slide surface onto the slide surfaces of the actuator bearing.

6. The assembly according to claim 1, wherein the driven friction element is a rotationally driven element having an annular outer contour.

7. The assembly according to claim 1, wherein the goniometer bearing comprises a goniometer plate mounted on a spatially fixed actuator frame and incorporating the actuator retainer by means of an opening.

8. The assembly according to claim 7, wherein the actuator retainer is held in the opening of the goniometer plate by a rear-bearing spring arrangement on the spatially fixed actuator frame.

9. The assembly according to claim 7, wherein the spring arrangement is formed by at least two pressure springs, wherein the paths of the compressive forces exerted by the pressure springs intersect in the region of a frictional element situated on the actuator body.

10. The assembly according to claim 1, wherein the friction element driven by the actuator body is a linearly driven friction element.

* * * * *